United States Patent
Wang et al.

(10) Patent No.: US 7,499,431 B2
(45) Date of Patent: Mar. 3, 2009

(54) METHOD FOR PERFORMING A NETWORK HANDOFF IN A WIRELESS NETWORK ENVIRONMENT

(75) Inventors: Li-Chun Wang, Hsin-Chu Hsien (TW); Hung-Hsi Chen, Hsin-Chu Hsien (TW); Ming-Bing Chen, Hsin-Chu Hsien (TW); Chang-Feng Lee, Tai-Nan (TW)

(73) Assignee: ZyXEL communications Corp., Hsinchu (TW)

( * ) Notice: Subject to any disclaimer, the term of this patent is extended or adjusted under 35 U.S.C. 154(b) by 601 days.

(21) Appl. No.: 11/307,613

(22) Filed: Feb. 14, 2006

(65) Prior Publication Data

US 2007/0189216 A1    Aug. 16, 2007

(51) Int. Cl.
*H04Q 7/00* (2006.01)
(52) U.S. Cl. ............ 370/331; 370/332; 370/338; 455/436
(58) Field of Classification Search ............. 455/422.1, 455/432.1–432.3, 436–444, 517–525; 370/331–347
See application file for complete search history.

(56) References Cited

U.S. PATENT DOCUMENTS

| | | | |
|---|---|---|---|
| 6,345,185 B1* | 2/2002 | Yoon et al. | 455/436 |
| 2006/0039327 A1* | 2/2006 | Samuel et al. | 370/331 |
| 2006/0178147 A1* | 8/2006 | Jagadeesan et al. | 455/436 |
| 2007/0047492 A1* | 3/2007 | Kim et al. | 370/331 |

* cited by examiner

*Primary Examiner*—George Eng
*Assistant Examiner*—Kamran Afshar
(74) *Attorney, Agent, or Firm*—Winston Hsu

(57) ABSTRACT

A method for performing an efficient handoff of a wireless endpoint to an access point in a wireless network environment includes measuring a number of stations utilizing the access point, selecting a broadcast count of the wireless endpoint according to the number of stations, selecting a retry count of the access point according to the number of stations, and performing the handoff of the wireless endpoint to the access point utilizing the selected broadcast count and retry count. The broadcast count corresponding to a number of probe request frames sent by the wireless endpoint to initiate the handoff of the wireless endpoint, and the retry count corresponding to a number of probe response frames sent by the access point to acknowledge receipt of the probe request frames.

11 Claims, 6 Drawing Sheets

METHOD FOR PERFORMING A NETWORK HANDOFF IN A WIRELESS NETWORK ENVIRONMENT

BACKGROUND OF THE INVENTION

1. Field of the Invention

The present invention relates to wireless networks, more particularly, to a method for maximizing the efficiency of a network handoff in a public wireless local area network (PWLAN) environment.

2. Description of the Prior Art

Advances and improvements in wireless communication technology have lead to an enormous increase in wireless usage over the past years. The popularity of wireless devices comes from their ease of use, their versatility, the geographical freedom they provide, and the vast amounts of information they are able to seamlessly exchange. Wireless users have the ability to choose from a multitude of wireless endpoints, including: cellular telephones, personal desktop assistants (PDAs), global positioning systems (GPS), pagers, and compact notebook computers. Each of these different endpoints typically connect to and communicate through a different network protocols. These wireless communications protocols may include: GSM, Bluetooth, WiFi (Wireless Fidelity), and WiMax.

One of the more popular types of regional network configurations is the public wireless local area network (PWLAN) utilizing an IEEE 802.11 protocol. This configuration allows a user to operate and communicate through a wireless endpoint (typically a notebook computer) in a semi macroscopic region. The increase and popularity in the usage of PWLANs have lead to rising demands for a seamless handoff across different networks in a PWLAN environment. When a wireless device switches communication from one network provider to another in a wireless environment of the same protocol, a certain latency time is associated with the horizontal handoff. Although this latency time may be acceptable for certain low bandwidth processes, such as Internet surfing, high bandwidth and real time processes are seriously hindered and delayed. For example, if a long latency time is experienced during a network handoff while involved in a voice over IP (VOIP) process, the performance and continuity of sound would be seriously interrupted, with lost segments in speech and disconnection possible.

Before commencing with a network handoff, a wireless endpoint performs a local scanning procedure to identify possible providers to connect to. Typically, the endpoint attempts to identify and connect to the provider with the greatest signal to noise ratio (SNR) to allow for the clearest and strongest transmissions. The active scanning performed by the wireless endpoint generally consists of two stages, a probe request, and a probe response. As a wireless endpoint moves from one wireless access region to another, it begins sending requests to the alternate wireless access points to initiate communication in the new region. Before commencing with communication, it must wait for a receipt of a probe response from the access point.

FIG. 1 is an exemplary diagram illustrating the probe request/response sequence performed by the wireless endpoint. In FIG. 1, the wireless endpoint consists of a notebook computer at a first position 100, and the same notebook computer at a second position 110. While in the first position 100 the wireless notebook is in the communication proximity of the current access point 120, and while in the second position 110, the wireless notebook is in the communication proximity of the neighboring access point 130. As the notebook computer moves from the first position 100 to the second position 110, it begins to lose a sufficient SNR with the current access point 120, and gain a strong SNR with the neighboring access point 130. As such, the wireless endpoint begins a network scan by sending probe requests to the neighboring access point 130 to locate the provider with the strongest SNR. If the probe request is received by the neighboring access point 130, it is acknowledged with a probe response. If the probe response is received by the wireless notebook, it will send an acknowledgement packet to the access point, and will be in communication with this provider as it reaches the second position 110, as utilizing the neighboring access point 130 in the current region would provide the greatest SNR.

Merely sending a probe request, however, does not automatically guarantee receiving a probe response. Many times, a probe request may not be received by the access point for various reasons. The probe request transmission may have its path blocked by an inanimate object, the request may be outside of the receiving range of the access point, or the probe request frame may collide with data frames from the existing users in the network. Therefore, oftentimes multiple probe requests have to be sent by the wireless endpoint before receiving a successful probe response. It is only upon the receipt of a successful probe request that a wireless endpoint can initiate communications through the access point.

The sending of probe requests and probe responses is therefore divided in time into "periods". Because of the potentially low probability of a single probe request receiving a successful probe response, multiple frames of probe requests and responses are sent within an entire period. For example, one probe request period may contain 3 individual probe request frames. Since the wireless endpoint sends out requests as an integer number of periods, the amount of individual probe request frames it can send in this case is 3 (1 probe request period). Each period contains a specific number of probe request frames or probe responses frames as determined by the system, however each individual probe request (or response) must be separated by a DIFS which acts as a buffer to space the frames in time.

FIG. 2 illustrates in depth the constitution of a period and the entire scanning process in accordance to IEEE 802.11 WLAN protocol. A probe request period 202 comprises a DIFS buffer separation 204 to provide spacing in time between signals, a contention delay 206, and a probe request frame 208. As illustrated in FIG. 2, the probe request period 202 in this example comprises two different probe request frames 208. The number of probe request frames 208 in a probe request period 202 is known as the broadcast count ($m_{req}$). Once a probe request period 202 is sent out, the access point waits for its receipt (indicated by the vertical dashed line) before sending out a probe response period 212. Similar to the construction of the probe request period 202, the probe response period 212 comprises a DIFS buffer separation 204, a contention delay 206, and a probe response frame 210. The number of probe response frames 210 in a probe response period 212 is known as the retry count (m'). Probe response periods 212 are thus continually sent back to the wireless endpoint until an acknowledgement frame 214 is successfully sent by the wireless endpoint back to the access point. The acknowledgement frame 214 is thus the confirming handshake that enables communication between the wireless endpoint and access point to begin. The total time required for this entire process from sending a probe request frame 208, to receiving an acknowledgement frame 214 is called the search latency ($t_b$). Finally, the minimum probe response time 220 is the time it takes for a mobile station to locate an access point in an idle channel, meaning a channel without access points in it. The maximum probe response time 230 is the time it takes an access point to receive an acknowledgement frame 214 upon the receipt of a probe request frame 208.

A high search probability ($P_{s\_search}$) is generally desired because it would increase the chances of locating an access point within one channel searching process step (one transmission of a probe request period and probe response period as shown in FIG. 2). However, as this process is statistical, if an access point is not located within the single transmission, another probe request period will have to be transmitted, adding further delay to the handoff process.

In order to increase the probability of a successful search ($P_{s\_search}$) for an access point, the broadcast count ($m_{req}$) of the probe request period 202 can be increased. This will increase the number of probe request frames 208 sent within a period and increase the odds of a successful reception in the event that some packets may not be received. However, increasing the broadcast count ($m_{req}$) is not without its disadvantages. Sending more probe request frames 208 will result in a longer probe request period 202. The additional probe request frames 208 will also require additional contention delays 206 and DIFS buffer separations 204 which will further lengthen the probe request period 202. The main parameter affected by this is the search latency ($t_b$), which may result in being unnecessarily long before a successful handoff can be confirmed.

For similar reasons, the retry count (m') of the probe response period 212 can also be increased to raise the probability of a successful search. A wireless endpoint must receive the response frame 210 from the access point before it can send out an acknowledgement frame 214. Therefore, increasing the retry count (m') of the probe response period 212 will also increase the odds of a successful reception, but will also equally increase the search latency ($t_b$) of the handoff process.

Reducing the broadcast count ($m_{req}$), or retry count (m') will surely reduce the search latency ($t_b$) delay, as the probe request period 202 and probe response period 212 will be shortened. However, due to the reduced number of request packets 208 and response packets 210 sent within a single period, a low probability of a successful search may result. Therefore the probability a successful handoff within a single period is further reduced.

SUMMARY OF THE INVENTION

One objective of the claimed invention is therefore to provide a method for performing a handoff of a wireless endpoint to an access point in a wireless network environment, to solve the above-mentioned problem through adjusting the broadcast count and retry count according to a number of stations utilizing an access point of the wireless network.

A method for performing a handoff of a wireless endpoint to an access point in a wireless network environment is disclosed. The method comprising selecting a broadcast count of the wireless endpoint according to the number of stations; selecting a retry count of the access point according to the number of stations; and performing the handoff of the wireless endpoint to the access point utilizing the selected broadcast count and retry count. The broadcast count corresponds to a number of probe request packets sent by the wireless endpoint to initiate the handoff of the wireless endpoint, and the retry count corresponds to a number of probe response packets sent by the access point to acknowledge receipt of the probe request packets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
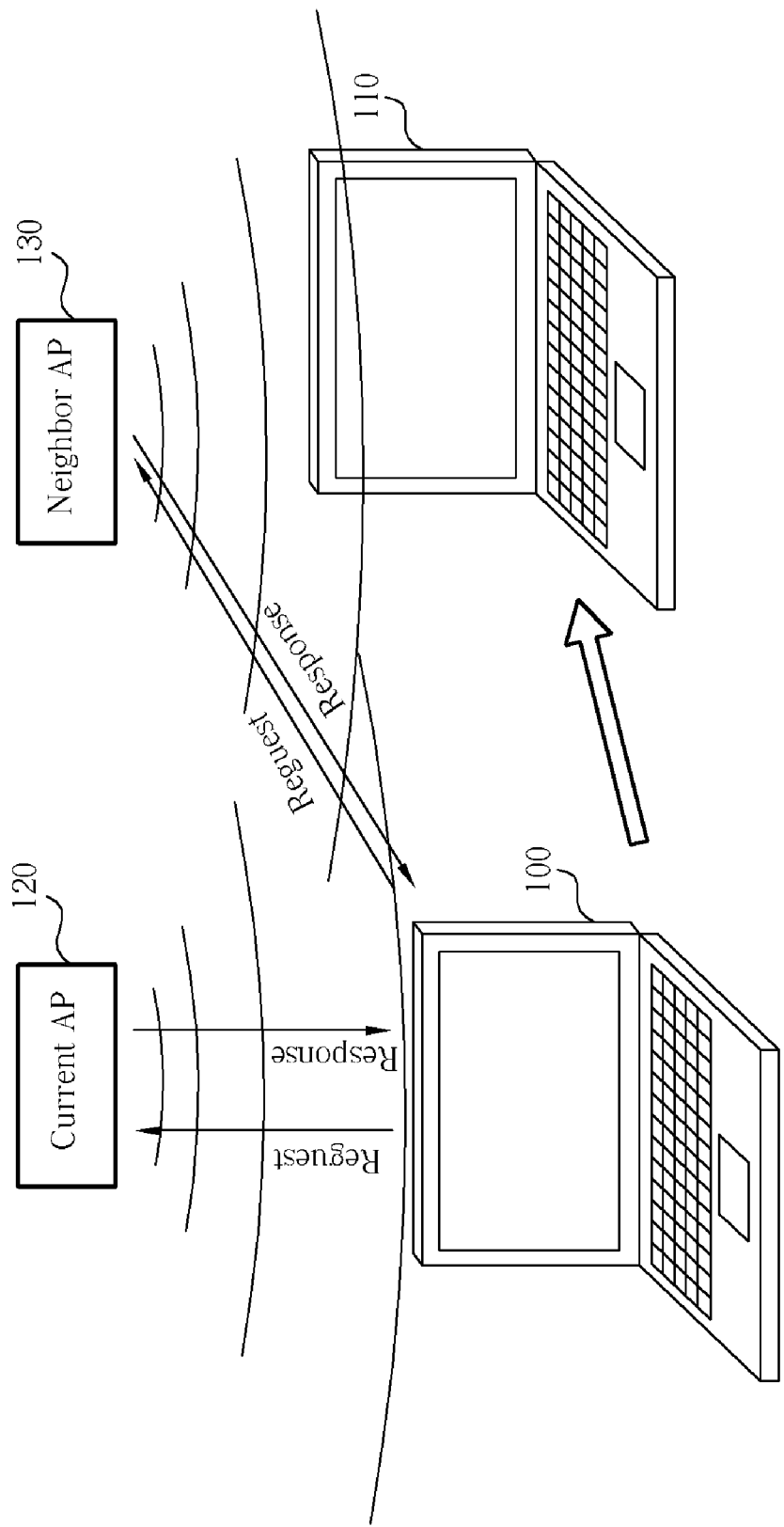
FIG. 1 is an exemplary diagram illustrating the probe request/response sequence performed by the wireless endpoint according to the related art.
Figure 2:
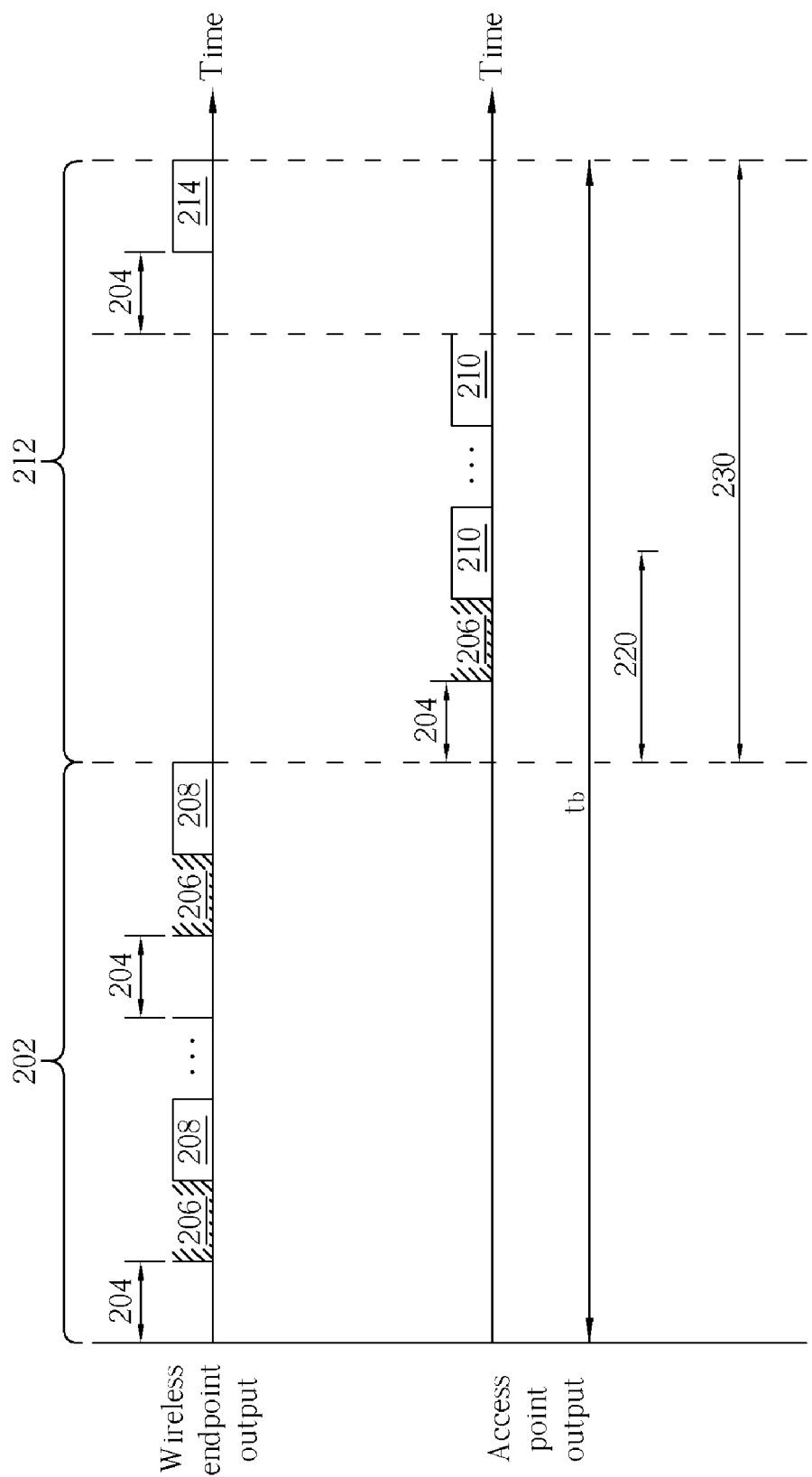
FIG. 2 illustrates in depth the constitution of a frame and the entire scanning process in accordance to IEEE 802.11 WLAN protocol according to the related art.

Typically, the combination of broadcast count ($m_{req}$) and retry count (m') are initially configured according to a preliminary network setup. However, when additional wireless endpoints are introduced or removed from the system, the number of stations (n) utilizing an access point of the wireless network is affected. A change in (n) is empirically found to change network handoff latency and search probabilities, and therefore, will affect the rationale used to select the initial combination of ($m_{req}$) and (m').

A goal of the present invention is therefore to maximize the efficiency of a wireless network handoff for a given network environment. This is accomplished by allowing the selection and setting of the broadcast count of a wireless endpoint, and the retry count from a wireless access point. The broadcast count and retry count combination are chosen according to the number of stations utilizing the wireless access point, and further to a selected performance criterion. For example, a specific combination of broadcast count and retry count can be selected for achieving the lowest possible latency time during a handoff, and another combination can be chosen for the highest probability of a successful handoff.

Another useful criterion for network handoff performance is maximizing the overall network efficiency in a wireless network handoff. This goal is contingent on maximizing the probability of a successful search ($P_{s\_search}$) or probability of a successful handoff ($P_{s\_HO}$), while minimizing the search latency ($t_b$) time in performing a network scan or handoff. Accomplishing this task will help in attaining a successful handoff while reducing the possible delay associated with a long search latency.

As previously described, increasing the probability of a successful search, or increasing the probability of a successful handoff likewise, typically entails increasing the broadcast count ($m_{req}$) and/or retry count (m'). However this will also act to increase the search latency ($t_b$), and will therefore reduce the overall efficiency of the network search or handoff. The probability of a successful search or handoff is therefore directly related to the search latency ($t_b$) as an increase in one parameter will act to increase the other, making the simultaneous optimization of both parameters a difficult task.

To overcome this obstacle and achieve the most effective combination of both successful search probability ($P_{s\_search}$) and search latency ($tb$), or successful handoff probability ($P_{s\_Ho}$) and handoff latency ($t_{Ho}$) for a truly efficient handoff process, two new handoff performance values titled "effective search time" (EST) and "effective handoff time" (EHT) are introduced. These handoff performance values each take into account the successful search and handoff probabilities, and search latencies to statistically determine which combination of network variable values will produce the most efficient overall network search or handoff. This is opposed to the traditional method of solely relying on one of the successful search probabilities, successful handoff probabilities, or search latencies to determine an efficient search or handoff.

The effective search time is a handoff performance value defined as the effective time from a wireless endpoint broadcast of a probe request frame until the successful receipt of a probe response frame. This value is described below as:

$$EST = \frac{t_b(n, m_{req}, m')}{p_{s\_search}(n, m_{req}, m')} \quad (1)$$

Where n is the number of existing stations in a target network. A wireless local area network may consist of several receiving/transmitting stations, and as such, this parameter is empirically found to affect the effective successful search time. The broadcast count $m_{req}$ is the number of probe request frames in a probe request period, and the retry count m' is the number of probe response frames in a probe response period.

From (1) we see that this formula takes into consideration both the search latency ($t_b$) and successful search probability ($P_{s\_search}$). For a minimized effective search time (EST), it is required that the search latency ($t_b$) be relatively minimized while the successful search probability ($P_{s\_search}$) be relatively maximized such that their simultaneous ratio results in an absolute minimum of the EST. Minimization of the EST in (1) will therefore render the optimal number of broadcast counts ($m_{req}$), and retry counts (m') in a transmission frame for optimization of the scanning procedure in a wireless network of n stations.

The effective handoff time (EHT) is another handoff performance value defined as the effective time from a wireless endpoint broadcast until it successfully locates at least one channel among all the channels of the wireless access point to connect to. It is expressed in (2) as:

$$EHT = \frac{t_{HO}}{P_{s\_HO}} + T_{exc} \quad (2)$$

and $t_{Ho}$ is the handoff latency for an overall handoff process. This is described below in (3), where a is the number of used channels, and b is the number of idle channels.

$$t_{HO} = a \cdot t_b + b \cdot t_{nb} \quad (3)$$

The successful handoff probability ($P_{s\_Ho}$) is defined as the probability of the wireless endpoint successfully locating at least one access point among the used channels. ($t_{nb}$) is the minimum waiting time when the endpoint scans at an idle channel. ($T_{exc}$) is the execution time after the endpoint has successfully scanned an available access point. Minimization of the effective handoff time (EHT) in (2) will result in an optimized set of broadcast counts ($m_{req}$) and retry counts (m') for the most efficient network handoff procedure. We see that the definition for (2) appears in similar form to that of (1), however it includes for the additional delays associated with scanning multiple channels, and peripheral connection delays ($t_{nb}$) and ($T_{exc}$). Therefore application of (2) may be better suited for an overall network handoff optimization, whereas (1) may be more relevant for a purely scanning application.

Application of equations (1) and (2) in determining optimized parameters for an efficient network search or handoff is performed empirically rather than mathematically. The choice of which equation to apply can be determined by the handoff performance value deemed more critical. Both the effective search time (EST) in (1) and the effective successful handoff time (EHT) in (2) are functions of network parameters $m_{req}$, m', and n. Therefore the optimization of (1) or (2) through empirical methods require that network parameters $m_{req}$, m', and n be systematically varied and tested in order to determine which combination produces an optimized handoff performance value of selected type. Since most network environments have the number of existing stations in a target network n as a fixed parameter, the combination of broadcast count $m_{req}$, and retry count m' that produces an optimized handoff performance value for a fixed n is typically sought.

Test sets should be produced for every practical combination of retry counts (m') and broadcast counts ($m_{req}$) for a set number of target network stations (n) in a specific network environment. Because of the uniqueness and empirical nature of this testing method, the test results produced will only be applicable for the exact network environment it was derived from. Each test set should be applied in order to determine the selected handoff performance value as a function of the network parameters $m_{req}$, m', and n. Typically, one would fix a value for n, and then systematically enter combinations of $m_{req}$ and m' to record the handoff performance value for each set. The number of target network stations n would then be systematically varied, and the handoff performance values again tested for each $m_{req}$ and m' set. This process is continually repeated until a full range of handoff performance values is attained for various combinations of network parameters $m_{req}$, m', and n.

Once a full range of handoff performance values are attained for various combinations of network parameters $m_{req}$, m', and n, identification of the optimized handoff performance values can be made. The combination of network parameters $m_{req}$, and m' that correspond to the optimized handoff performance value for each number of network stations n can then be stored into a corresponding lookup table for reference.

Figure 3:
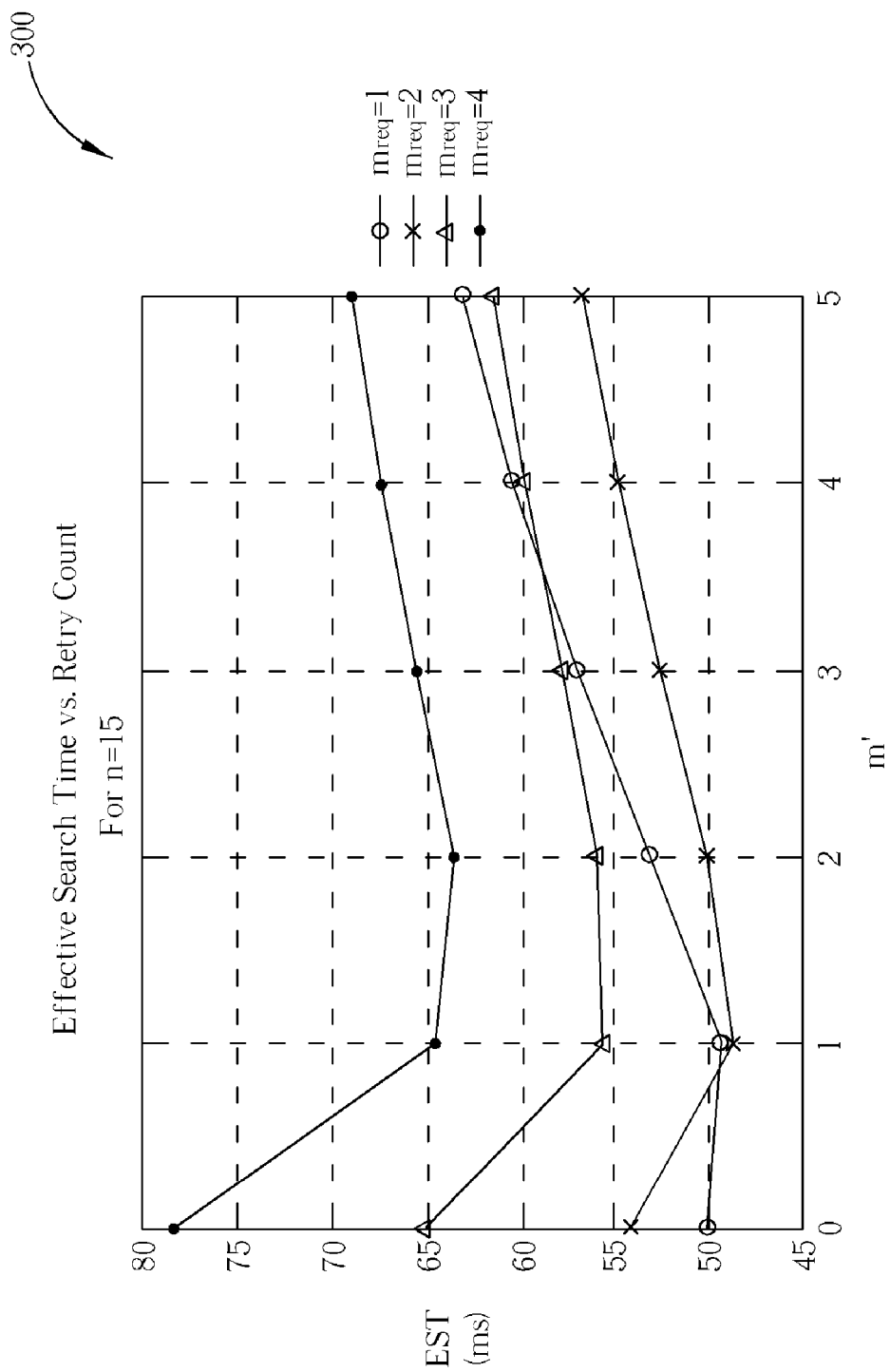
FIG. 3 illustrates an exemplary plot of EST against (m') with differing series of ($m_{req}$) for a set number of n=15 stations in a target network according to an exemplary embodiment of the present invention.

As an example of how to identify the optimized handoff performance value as described above, a series of exemplary plots are shown. The effective search time (EST) shown in eq. (1) is selected as the handoff performance value in this example, with the optimized handoff performance value in this case corresponding to the minimum effective search time. FIG. 3 illustrates an exemplary plot 300 of this type, plotting the EST against (m') with differing series of ($m_{req}$) for a set number of n=15 stations in a target network. Each series of $m_{req}$ in the plot corresponds a different set number of broadcast counts. From the exemplary plot of 300, we see that the effective search time (EST) appears minimized at about 50 ms for a broadcast count of $m_{req}$=2 and retry count m'=1 for the case of n=15 stations. Therefore, to minimize the effective search time (EST) of a network consisting of n=15 stations in this example, one should set the broadcast count to $(m_{req})=2$ and retry count m'=1.

Figure 4:
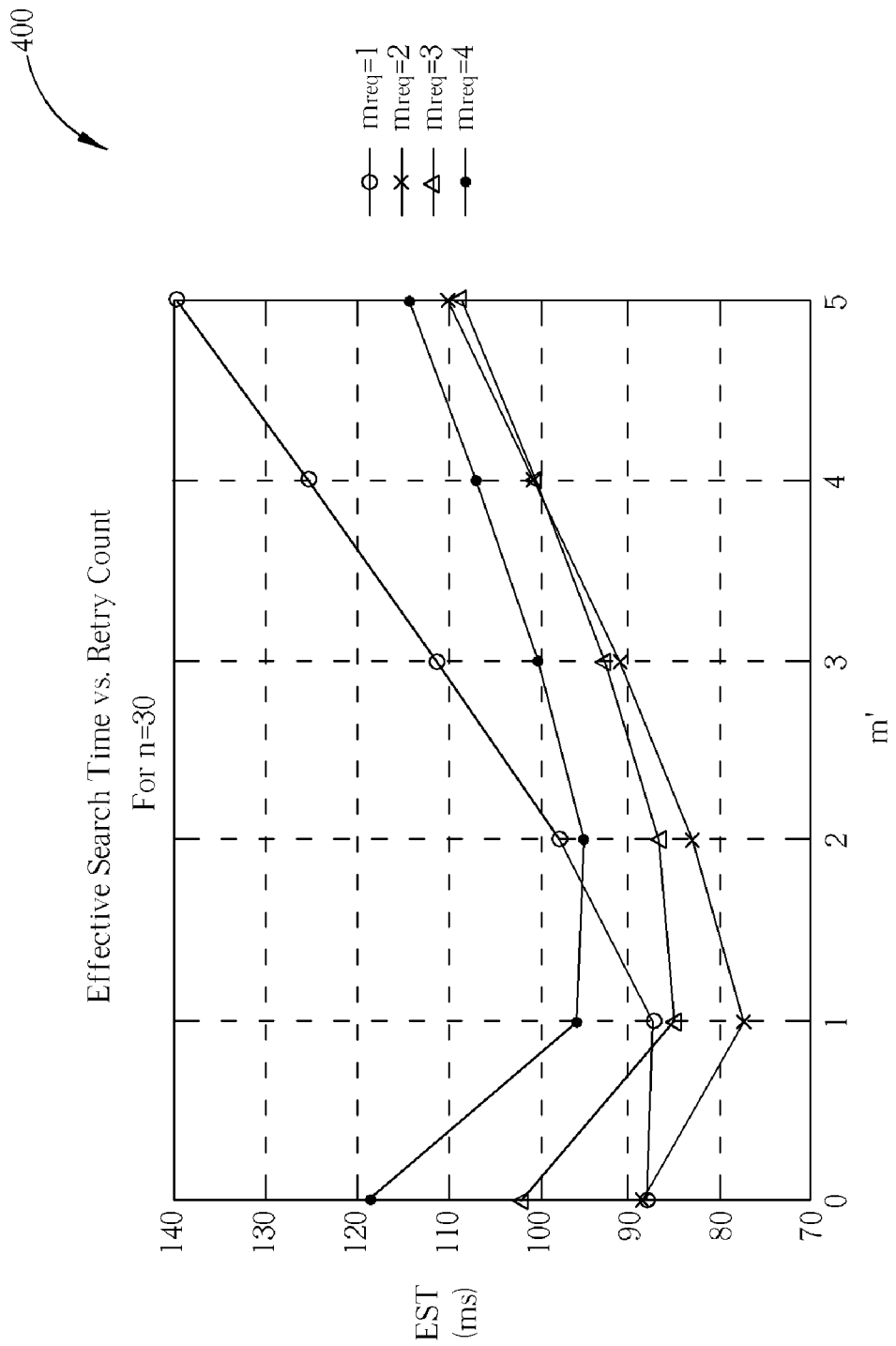
FIG. 4 shows another exemplary plot of the effective search time vs. m', but for n=30 stations in a target network according to another exemplary embodiment of the present invention.

A similar example is again shown in FIG. 4. FIG. 4 shows another exemplary plot 400 of the effective search time vs. m', but for n=30 stations in a target network. In this plot, the effective search time (EST) appears minimized at about 80 ms for a broadcast count of $m_{req}=2$ at m'=1. Alternate series of $m_{req}$ appear vertically offset above this value. Therefore, to minimize the effective search time (EST) for a network of n=30 stations in this example, one should set the broadcast count to $(m_{req})=2$ and retry count to (m')=1.

It is stressed that the handoff performance value is not limited to being the effective search time (EST) as shown in the above example, but can comprise of other values relevant to handoff performance. The effective handoff time (EHT) shown in eq.(2) could also equally be selected as the handoff performance value above. In this case, the optimized handoff value would correspond to the lowest effective handoff time (EHT). Other possible handoff performance parameters may also include simply the successful search probability or search latency. The choice of handoff performance value can therefore be arbitrarily selected according to network preference and utilized to optimize a network handoff for the selected type.

Upon the selection of a desired handoff performance value type, a process similar to that shown in FIG. 3 and FIG. 4 can be executed to identify the optimized handoff value for a given n. The combination of $m_{req}$ and m' that corresponds to the optimized handoff value can then be stored into a lookup table. The lookup table acts to provide a mapping of which combinations of $m_{req}$ and m' will result in the optimized handoff value for a given number of network stations n. Prior to a network handoff, a wireless endpoint and/or access point can then reference this lookup table, and configure itself according to its information and adjust its intrinsic parameters such that the optimized handoff value will be achieved during a network handoff.

Just as multiple network handoff value types can be selected, multiple lookup tables can also be compiled and stored. Each individual lookup table corresponds to a selected handoff performance value type and maps the combinations of $m_{req}$ and m' which will result in the optimized handoff performance value for a given n. Prior to a network handoff, a wireless endpoint and/or access point can further reference the desired lookup table according to the preferred handoff performance value type. The network can then configure itself to utilize the information in the selected lookup table and adjust its intrinsic parameters such that the desired handoff performance value is optimized during the network handoff process.

Figure 5:
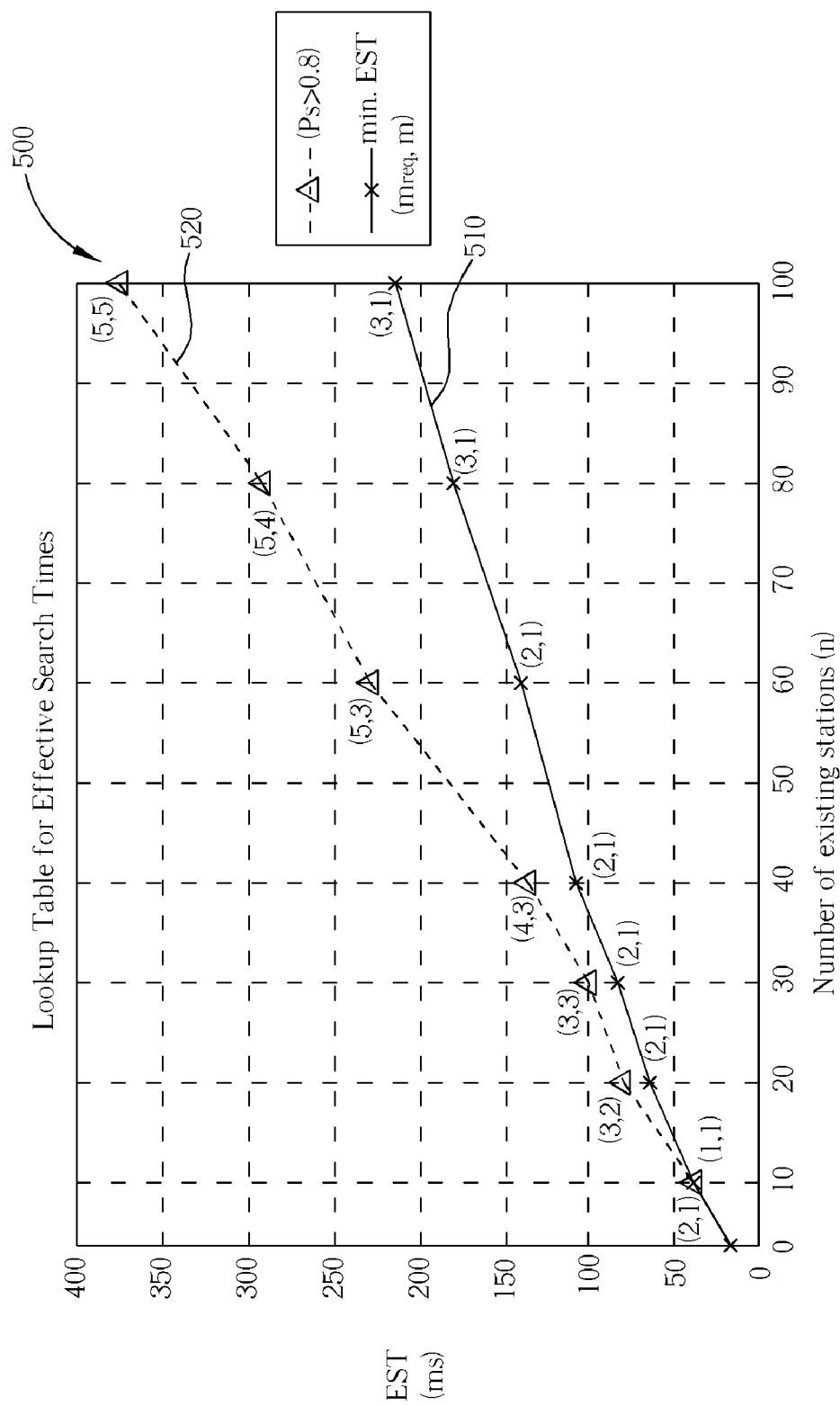
FIG. 5 shows a visual plot illustrating a lookup table storing a combination of network parameters $m_{req}$, and m' that correspond to the optimized handoff performance value for each number of network stations n according to an exemplary embodiment of the present invention.

A visual plot illustrating an embodiment of the above described lookup tables are shown in FIG. 5. The lookup table 500 in FIG. 5 illustrates combinations of $m_{req}$ and m' that results in the optimized handoff performance values for a given number of network stations. In this embodiment, two handoff performance value types are illustrated: minimum effective search time 510, and high reliability 520. When configuring a system for minimum EST, one can utilize the minimum EST series 510 in the exemplary lookup table 500. For example, when operating in a network environment of n=40 stations, one should set network parameters such that $m_{req}=2$ and m'=1 to ensure that EST is minimized in a scanning process in this environment setting. The high reliability series 520 in this embodiment corresponds to combinations of $m_{req}$ and m' that have a successful search probability over 80 percent ($P_s \geq 0.8$). As an example, when trying to attain a high reliability for a network environment of n=60 stations, one should then set network parameters such that $m_{req}=5$ and m'3 to ensure that the successful search probability (reliability) remains over 80 percent. By following the data points of lookup table 500 according to a desired handoff performance type, one can ensure an optimized scanning process for any chosen value of network stations n.

Figure 6:
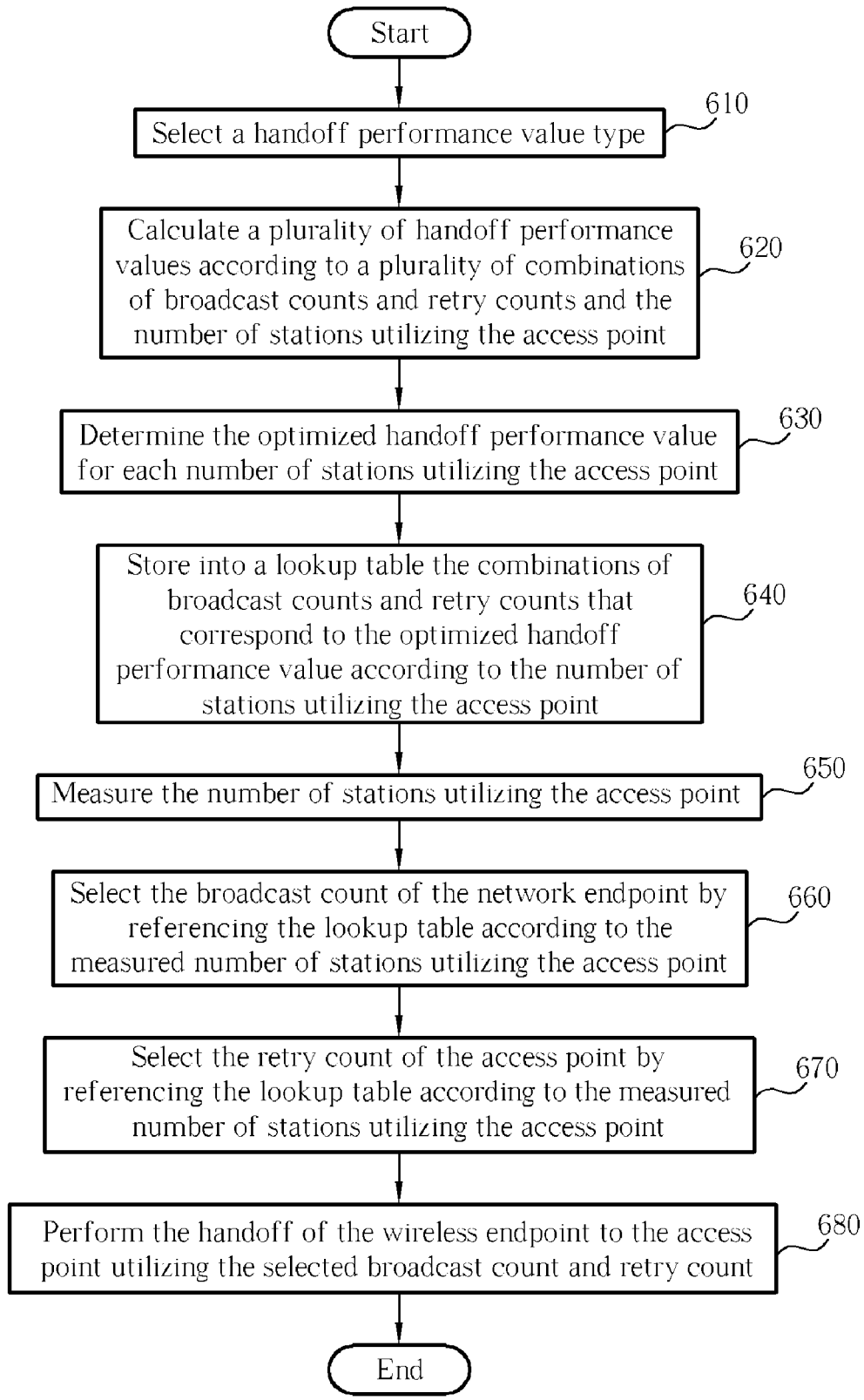
FIG. 6 shows a flowchart for the above described process to maximize the efficiency of a wireless network handoff for a given network environment according to an exemplary embodiment of the present invention.

FIG. 6 shows a flowchart 600 for the above described process to maximize the efficiency of a wireless network handoff for a given network environment according to an exemplary embodiment of the present invention. Provided that substantially the same result is achieved, the steps of the flowchart 600 need not be in the exact order shown and need not be contiguous, that is, other steps can be intermediate. In this embodiment, the process includes the following steps:

Step 610 Select a handoff performance value type.

Step 620 Calculate a plurality of handoff performance values according to a plurality of combinations of broadcast counts and retry counts and the number of stations utilizing the access point.

Step 630 Determine the optimized handoff performance value for each number of stations utilizing the access point.

Step 640 Store into a lookup table the combinations of broadcast counts and retry counts that correspond to the optimized handoff performance value according to the number of stations utilizing the access point.

Step 650 Measure the number of stations utilizing the access point.

Step 660 Select the broadcast count of the network endpoint by referencing the data table according to the measured number of stations utilizing the access point.

Step 670 Select the retry count of the access point by referencing the data table according to the measured number of stations utilizing the access point.

Step 680 Perform the handoff of the wireless endpoint to the access point utilizing the selected broadcast count and retry count.

In order to maximize the efficiency of a wireless network handoff for a given network environment, two handoff performance values have been introduced. The effective search time (EST) takes into account both the search latency ($t_b$) and the probability of a successful search ($P_{s\_search}$) to statistically determine which combination of network variables ((n), (m') and ($m_{req}$)) will yield the most efficient scanning process in a network handoff. The effective handoff time (EHT) takes into account the probability of a successful handoff ($P_{s\_HO}$) and the search latency ($t_b$) to statistically determine the most efficient network handoff as a function of the network variables. These equations overcome the trade-off relationship associated with search latency and the search or handoff probabilities, and manage to find a combination of both such that the overall scanning or handoff process is optimized for efficiency.

Upon the selection and designation of a preferred handoff performance value type, statistical systematic application can be performed to identify the network variable values that produce optimized results for the selected handoff performance value. These empirically found optimized network variables can then be stored into various lookup tables for future reference. A wireless endpoint or network can then tune its network variables to the values located in the lookup tables. This generally entails the selection and setting of the broadcast count of a wireless endpoint, and the retry count from a wireless access point according to the number of stations utilizing the wireless access point, and further to the selected handoff performance criterion. In this manner, this process will help ensure that the most effective and efficient scanning or handoff process is achieved for a given network environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing a handoff of a wireless endpoint to an access point in a wireless network environment, the method comprising:

measuring a number of stations utilizing the access point;

selecting a broadcast count of the wireless endpoint according to the number of stations;

selecting a retry count of the access point according to the number of stations; and performing the handoff of the wireless endpoint to the access point utilizing the selected broadcast count and retry count;

wherein the broadcast count corresponds to a number of probe request frames sent by the wireless endpoint to initiate the handoff of the wireless endpoint, and the retry count corresponds to a number of probe response frames sent by the access point to acknowledge receipt of the probe request frames.

2. The method of claim 1, wherein the wireless network environment is a public wireless local area network.

3. The method of claim 1, wherein the wireless network environment is an IEEE 802.11 compliant wireless local area network.

4. The method of claim 1, further comprising:

storing a data table mapping a particular broadcast count and retry count corresponding to a particular number of stations utilizing the access point; and selecting the broadcast count of the network endpoint and selecting the retry count of the access point by referencing the data table according to number of stations utilizing the access point.

5. The method of claim 4 further comprising programming the data table by:

calculating a plurality of handoff performance values according to a plurality of combinations of broadcast counts and retry counts and the number of stations utilizing the access point; and storing in the data table the combination of broadcast count and retry count that produces an optimized handoff performance value from the plurality of handoff performance values for each specific number of stations utilizing the access point.

6. The method of claim 5, further comprising calculating a plurality of handoff performance values according to a plurality of combinations of broadcast counts and retry counts for all possible number of stations utilizing the access point.

7. The method of claim 5, wherein the handoff performance values correspond to an effective search time, and the optimized handoff performance value corresponds to a lowest effective search time.

8. The method of claim 7, wherein the effective search time is defined as the ratio of a latency time over a successful search probability, the latency time defined as a period of time from a first transmittal of a probe request frame by the wireless endpoint to the acknowledgement of the receipt of the probe request frame by the access point, the successful search probability defined as the probability that a transmittal of the probe request frame by the wireless endpoint is returned by the probe response frame from the access point.

9. The method of claim 5, wherein the handoff performance values correspond to a successful search probability, and the optimized handoff performance value corresponds to a highest successful search probability, the successful search probability defined as the probability that a transmittal of the probe request frame by the wireless endpoint is returned by the probe response frame from the access point.

10. The method of claim 5, wherein the handoff performance values correspond to an effective handoff time, the effective handoff time being defined as a period of time from a first transmittal of a probe request frame by the wireless endpoint to the successful connection of at least a single channel amongst a plurality of channels of the access point, and the optimized handoff performance value corresponding to a lowest effective handoff time.

11. The method of claim 4, further comprising:

storing a plurality of data tables, each data table corresponding to a unique handoff performance value, each data table for mapping a particular combination of broadcast count and retry count corresponding to the number of stations utilizing the access point;

selecting a particular data table according to a desired handoff performance value; and selecting the broadcast count of the network endpoint and selecting the retry count of the access point by referencing the selected data table according to number of stations utilizing the access point.

* * * * *